US011623418B2

(12) United States Patent
Kuruppuarachchige et al.

(10) Patent No.: US 11,623,418 B2
(45) Date of Patent: Apr. 11, 2023

(54) MULTI-CELL HEATING BLANKETS THAT FACILITATE COMPOSITE FABRICATION AND REPAIR

(71) Applicant: The Aurora Flight Sciences Corporation, Manassas, VA (US)

(72) Inventors: Chathuranga Kuruppuarachchige, Bristow, VA (US); Edward Albert Wen, Centreville, VA (US); Josiah Hughes, Centreville, VA (US); Michelle Mahon, Oakton, VA (US)

(73) Assignee: The Aurora Flight Sciences Corporation, Manassas, VA (US)

( * ) Notice: Subject to any disclaimer, the term of this patent is extended or adjusted under 35 U.S.C. 154(b) by 404 days.

(21) Appl. No.: 16/504,720

(22) Filed: Jul. 8, 2019

(65) Prior Publication Data

US 2021/0008766 A1    Jan. 14, 2021

(51) Int. Cl.
| | | |
|---|---|---|
| *B29C 70/54* | (2006.01) | |
| *B29C 73/34* | (2006.01) | |
| *B29C 35/02* | (2006.01) | |
| *B64F 5/10* | (2017.01) | |
| *B29K 307/04* | (2006.01) | |
| *B29L 31/30* | (2006.01) | |

(Continued)

(52) U.S. Cl.
CPC .......... *B29C 73/34* (2013.01); *B29C 35/0227* (2013.01); *B29C 35/0288* (2013.01); *B29C 70/54* (2013.01); *B64F 5/10* (2017.01); *B29K 2101/10* (2013.01); *B29K 2105/0881* (2013.01); *B29K 2307/04* (2013.01); *B29L 2031/3076* (2013.01)

(58) Field of Classification Search
CPC . B29C 35/0288; B29C 35/0227; B29C 70/30; B29C 70/54; B29K 2101/10; B29K 2105/0881; B29K 2307/04; B29L 2031/3076
USPC ....................................................... 264/40.6
See application file for complete search history.

(56) References Cited

U.S. PATENT DOCUMENTS 8,043,453 B2 * 10/2011 Sawicki .................. B29C 73/12
156/286
2017/0100894 A1 * 4/2017 Burns ................. B29C 35/0288

FOREIGN PATENT DOCUMENTS

WO    WO-2015160395 A1 * 10/2015 ............. B29C 73/32

OTHER PUBLICATIONS

NetComposites; Composite materials guide: Repair; https://netcomposites.com/guide-tools/guide/repair; May 29, 2019.
RTV Silicone; Wikipedia; May 3, 2019.

* cited by examiner

*Primary Examiner* — Jeffrey M Wollschlager
*Assistant Examiner* — Xue H Liu
(74) *Attorney, Agent, or Firm* — Yee & Associates, P.C.

(57) ABSTRACT

Systems and methods are provided for curing a composite part. The method includes the steps of: disposing a heat blanket at a composite material; applying, with a controller, power to heaters distributed across multiple cells of a heat blanket to heat the composite material at the heat blanket; monitoring, with the controller, a temperature of the composite material at each of the multiple cells via thermocouples distributed across the multiple cells; and individually adjusting, with the controller, an amount of power applied to the heaters, for each of the multiple cells, in response to the monitored temperature and a target temperature.

29 Claims, 11 Drawing Sheets

(51) Int. Cl.
*B29K 101/10* (2006.01)
*B29K 105/08* (2006.01)

MULTI-CELL HEATING BLANKETS THAT FACILITATE COMPOSITE FABRICATION AND REPAIR

FIELD

The disclosure relates to the field of fabrication and repair, and in particular, to fabrication and repair of composite parts.

BACKGROUND

Composite parts may comprise layers of thermoset or thermoplastic resin reinforced by fibers (e.g., glass fibers, carbon fibers, etc.). Throughout an operational lifetime, portions of composite parts may be inspected and repaired. Repair involves filling portions of the composite part with additional resin and fibers, and heating the filled portions to a curing temperature at which the additional resin and fibers solidify. However, portions of a composite part that undergo repair may include complex contours, or may be made from heterogeneous combinations or arrangements of materials. This causes the portions of the composite part that are undergoing repair to be heated unevenly (e.g., because they have different amounts of thermal mass). Thus, even when a heating element is directly applied atop a portion of a composite part that is desired for repair, the curing process may be applied unevenly to underlying resin and fibers. If a curing process is not performed to within desired tolerances, this may result in the portion of the composite part being discarded or reworked, which is undesirable.

Therefore, it would be desirable to have a method and apparatus that take into account at least some of the issues discussed above, as well as other possible issues.

SUMMARY

Embodiments described herein provide for multi-cell heating blankets which include their own independent heat sensors and heaters. By monitoring temperature at each of multiple cells within the heating blanket, a controller is capable of adjusting current applied to each heater in order to control a desired level of temperature at a portion of the composite part that contacts the cell. These techniques can be utilized to facilitate fabrication and/or repair processes for composite parts, in particular thermoset composite parts. In further embodiments, control of the multiple cells is informed by machine learning processes.

One embodiment is a method for curing a composite part. The method includes the steps of: applying a heat blanket to a composite material; applying, with a controller, power to heaters distributed across multiple cells of a heat blanket to heat the composite material at an interface with the heat blanket; monitoring, with the controller, a temperature of the composite material at each of the multiple cells via thermocouples distributed across the multiple cells; and individually adjusting, with the controller, an amount of power applied to the heaters, for each of the multiple cells, in response to the monitored temperature and a target temperature.

A further embodiment is a non-transitory computer readable medium embodying programmed instructions which, when executed by a processor, are operable for performing a method for curing a composite part. The method includes the steps of: applying a heat blanket to a composite material; applying, with a controller, power to heaters distributed across multiple cells of a heat blanket to heat the composite material at an interface with the heat blanket; monitoring, with the controller, a temperature of the composite material at each of the multiple cells via thermocouples distributed across the multiple cells; and individually adjusting, with the controller, an amount of power applied to the heaters, for each of the multiple cells, in response to the monitored temperature and a target temperature.

A further embodiment is an apparatus for curing a composite part. The apparatus includes a heat blanket comprising multiple cells, each of the multiple cells including a heater and a thermocouple. The apparatus further includes a controller that applies power to heaters distributed across the multiple cells of the heat blanket to heat a fiber-reinforced material, monitors a temperature of the fiber-reinforced material at each of the multiple cells via the thermocouples, and for each of the cells, adjusts an amount of power applied to a heater in the cell, based on whether a thermocouple in the cell indicates a target temperature has been reached, wherein the controller has been trained via reinforcement learning.

A further embodiment is a method for fabricating a composite part. The method includes disposing a preform comprising a fiber-reinforced material impregnated with a thermoset resin onto a mandrel, applying a heat blanket over the preform, heating the preform within the autoclave, monitoring a temperature of the fiber-reinforced material at each of multiple cells within the heat blanket via thermocouples distributed across the multiple cells, and selectively applying power to heaters distributed across the multiple cells of the heat blanket to control local heating at the preform while the preform is heated, based upon a temperature at each of the multiple cells.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. In many preforms, individual fibers within each layer of the preform are aligned parallel with each other (i.e., unidirectionally), but different layers may exhibit different fiber orientations in order to increase the strength of the resulting composite part along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
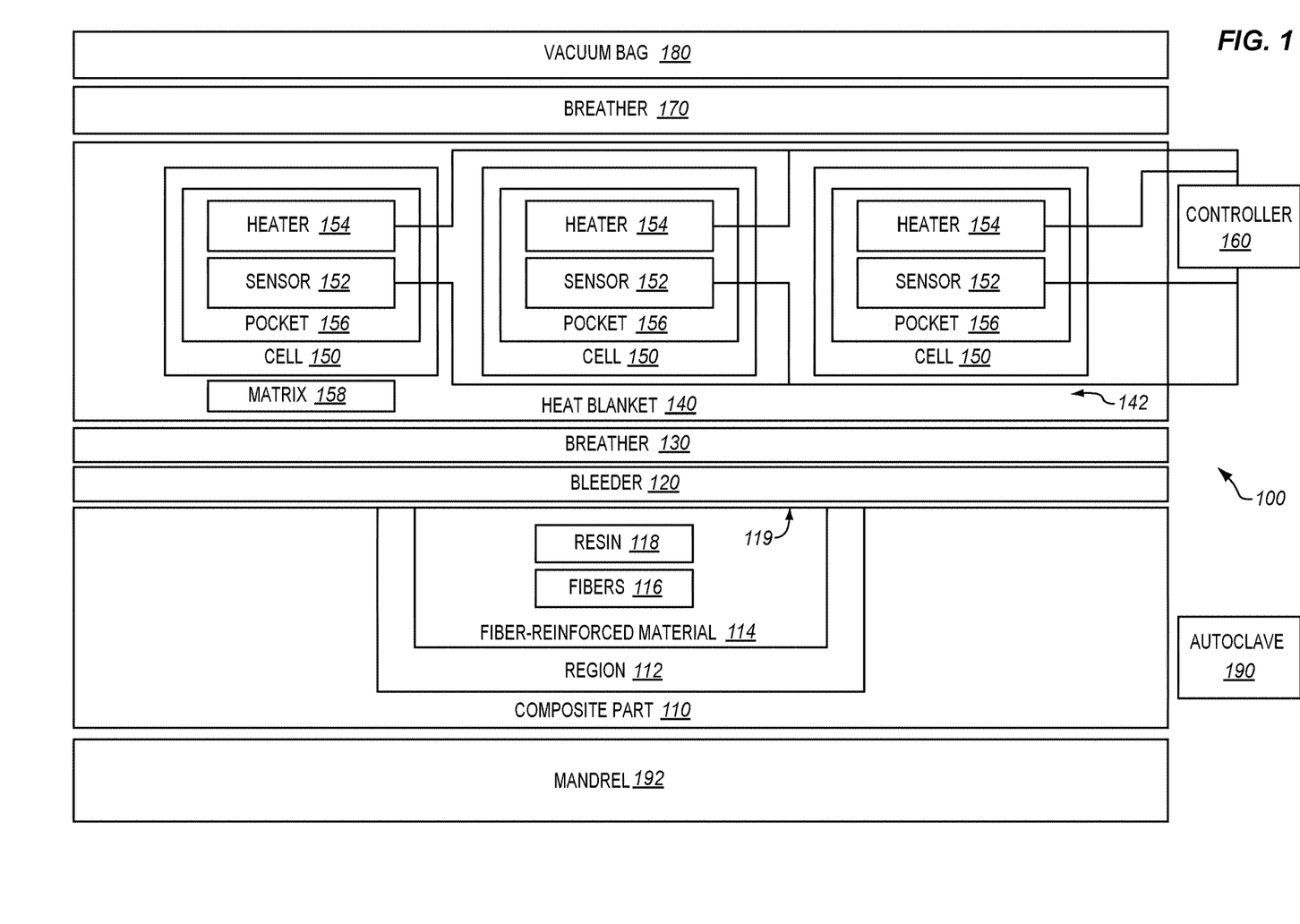
FIG. 1 is a block diagram of a curing system for composite parts in an illustrative embodiment.

FIG. 1 is a block diagram of a curing system 100 for composite parts in an illustrative embodiment. According to FIG. 1, curing system 100 comprises any system, device, or component operable to heat a resin within a composite part to a curing temperature for the purposes of fabrication or repair. In this embodiment, curing system 100 includes a heat blanket 140, which includes cells 150 arranged in a pattern 142. Illustrative examples of pattern 142 include rectangular grids (e.g., grid 402 of FIG. 4), arcuate portions of concentric circles (e.g., as per pattern 502 of FIG. 5), hexagonal grids (e.g., grid 602 of FIG. 6), etc. Each cell 150 in the heat blanket 140 is physically distinct from other cells, and each cell 150 includes a pocket 156 (e.g., a void) that includes a heater 154 (e.g., a resistive heater) and a sensor 152 (e.g., a thermocouple). Heat blanket 140 is made from a matrix 158 of silicone rubber or other temperature-resistant material.

Temperature measurements acquired by the sensors 152 are provided to a controller 160, and the controller 160 adjusts an amount of heat generated by each of the heaters 154 based on these temperature measurements. In this manner, the heaters 154 are individually adjustable by the controller 160. Controller 160 may be implemented, for example, as custom circuitry, as a hardware processor executing programmed instructions, or some combination thereof.

During operation, the heat blanket 140 is placed beneath a vacuum bag 180 and a breather 170. The vacuum bag 180 is sealed to the composite part 110 (e.g., in instances of repair) or to an underlying mandrel (e.g., in instances of fabrication). This causes the vacuum bag 180 to hold the heat blanket 140 in place.

In addition to being inserted below the vacuum bag 180, the heat blanket 140 is placed atop a breather 130 and a bleeder 120. The breather 130 and the breather 170 provide passageways for gas trapped within the composite part 110 to escape during curing, and the bleeder 120 absorbs excess resin that may exit the region 112 of composite part 110 during curing. The breather 130 and the bleeder 120 are themselves placed atop a region 112 of a composite part 110. The region 112 is a portion of the composite part 110 that is awaiting repair or fabrication. As shown in FIG. 1, region 112 is filled with a fiber-reinforced material 114 comprising resin 118 and fibers 116. By selectively controlling application of heat by the cells 150 to different portions of a surface 119 of the region 112, the controller 160 is capable of ensuring that the region 112 is heated to a curing temperature of the resin 118 in a uniform manner.

FIG. 1 further depicts a mandrel 192, onto which a preform for a composite part may be laid-up during fabrication processes, and an autoclave 190, into which a preform and associated vacuum bagging materials may be inserted. The mandrel 192 is not necessary to facilitate repair, but may be utilized during fabrication. In one embodiment, the autoclave 190 is utilized in situations where the composite part 110 to be repaired is separable from the aircraft or when the composite part 110 is being initially fabricated. Breather 130 is distinguished from breather 170 in that breather 130 may form a sheet that covers the region 112, and breather 170 may comprise one of many edge breathers.

Illustrative details of the operation of curing system 100 will be discussed with regard to FIG. 2. Assume, for this embodiment, that region 112 is a portion of a composite part awaiting repair.

Figure 2:
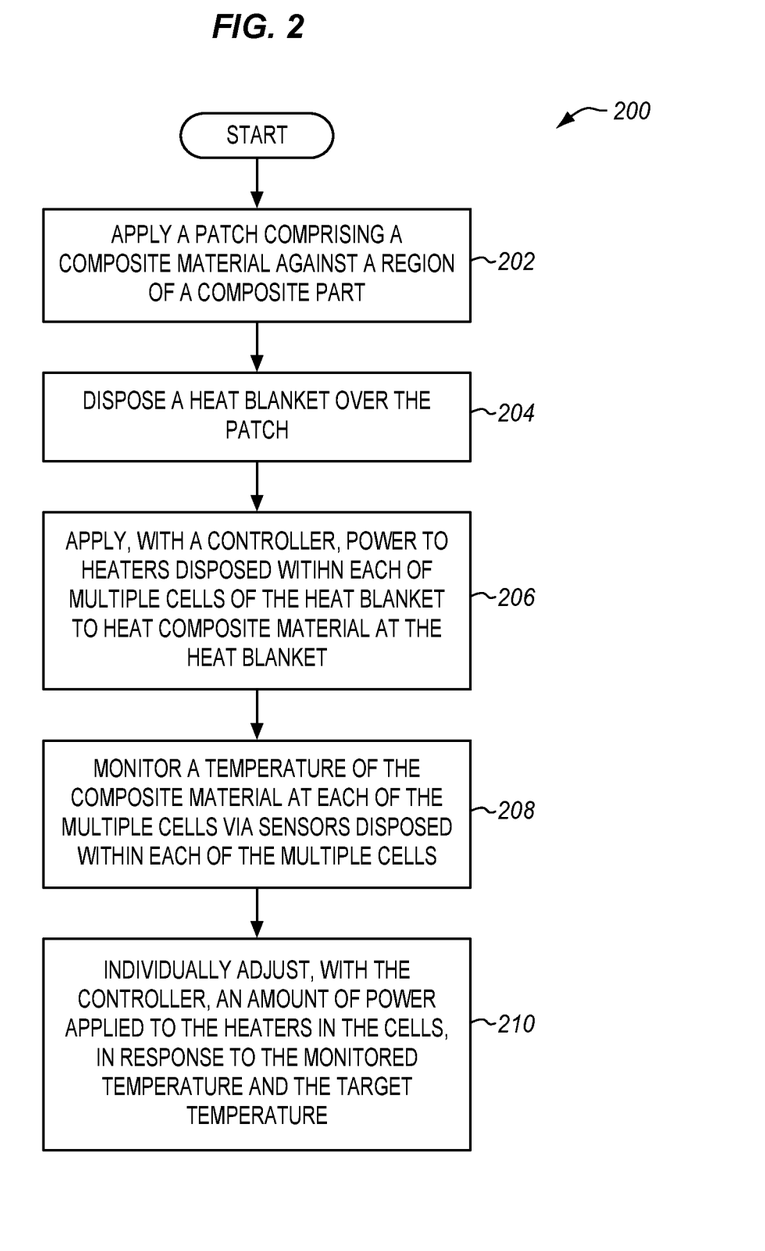
FIG. 2 is a flowchart illustrating a method for repairing composite parts in an illustrative embodiment.

FIG. 2 is a flowchart illustrating a method 200 for repairing composite parts in an illustrative embodiment. The steps of method 200 are described with reference to curing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, a technician, machine, or robot applies a patch comprising a composite material (e.g., a fiber-reinforced material 114), which is impregnated with a thermoset resin, against the region 112 of the composite part 110. In one embodiment, the patch comprises layers of unidirectional fiber-reinforced material or a pre-preg fabric, while in further embodiments, the patch comprises a volume of resin that is reinforced by randomly oriented fibers.

In step 204, the heat blanket 140 is placed/applied/disposed over/to the patch (or at any composite material). The heat blanket 140 covers an area that surrounds an exposed surface of the patch. The heat blanket 140 may be secured around the region 112 (e.g., just beyond the region 112) via a sealant in order to ensure that the heat blanket 140 does not move relative to the region 112 during curing. For example, in one embodiment a vacuum bag layup such as that depicted in FIG. 1 is implemented, and the vacuum bag 180 seals the heat blanket 140 in place relative to the region 112. In one embodiment, vacuum bag 180 is sealed to the composite part 110 just beyond the perimeter of the heat blanket 140, which in turn is sealed to the composite part 110 just beyond the perimeter of the region 112. In embodiments where heat blanket 140 is coupled for communication via a wired connection (e.g., instead of a wireless connection), wires from the heat blanket 140 proceed out from under the perimeter of the vacuum bag 180 for coupling to a computer. A vacuum is then applied under the vacuum bag 180 to consolidate/compress the region 112 prior to beginning a cure cycle.

In step 206, the controller 160 applies power to heaters 154 distributed across (e.g., disposed within each of) multiple cells of the heat blanket to heat an interface with the composite material (e.g., region 112). Applying power (i.e., current) to the heaters 154 initiates an increase in temperature along the patch, causing portions of the patch to approach a curing temperature.

In step 208, the controller 160 monitors a temperature of the composite material at each of the cells 150, via sensors 152, which are also distributed across (e.g., disposed within each of) the cells 150. In one embodiment, the controller 160 monitors the temperature of each cell simultaneously (e.g., at a rate of thousands of times per second), and stores this information in memory. Thus, the system enables real-time control of temperature, and utilizes feedback control to ensure that each region of the blanket provides a required amount of heat needed to cure.

In step 210, for each of the cells 150, the controller 160 individually adjusts an amount of power applied to a heater in the cell, in response to the monitored temperature and the target temperature (e.g., based on whether the sensor in the cell indicates that a target temperature (e.g., a curing temperature of the resin 118 within the region 112) has been reached). In one embodiment, adjusting the amount of power comprises decreasing power/amperage applied to the heater in the cell in response to determining that a cell temperature is higher than the target temperature, and increasing power/amperage applied to the heater in the cell in response to determining that the cell temperature is lower than the target temperature.

In further embodiments, the target temperature is a range of temperatures that varies over time (e.g., by increasing over time), and may include a curing temperature. In such instances, the controller 160 increases the amount of current applied by a heater 154 if a sensor 152 indicates that the cell 150 is below a lower bound of the current range of temperatures, and decreases the amount of current applied by the heater 154 if the sensor 152 indicates that the cell 150 is above a upper bound of the current range of temperatures. The steps of monitoring and adjusting power for each of the cells 150 may be performed simultaneously or rapidly in sequence by the controller 160 in order to achieve conformance with a desired temperature profile over time.

Method 200 provides a technical benefit over prior techniques, because it enables localized heating to be performed in a manner that accounts for heterogeneous part composition or geometry. This in turn increases the efficacy of curing processes applied to a composite part undergoing repair, which reduces the number of repairs that are out of tolerance.

Figure 3:
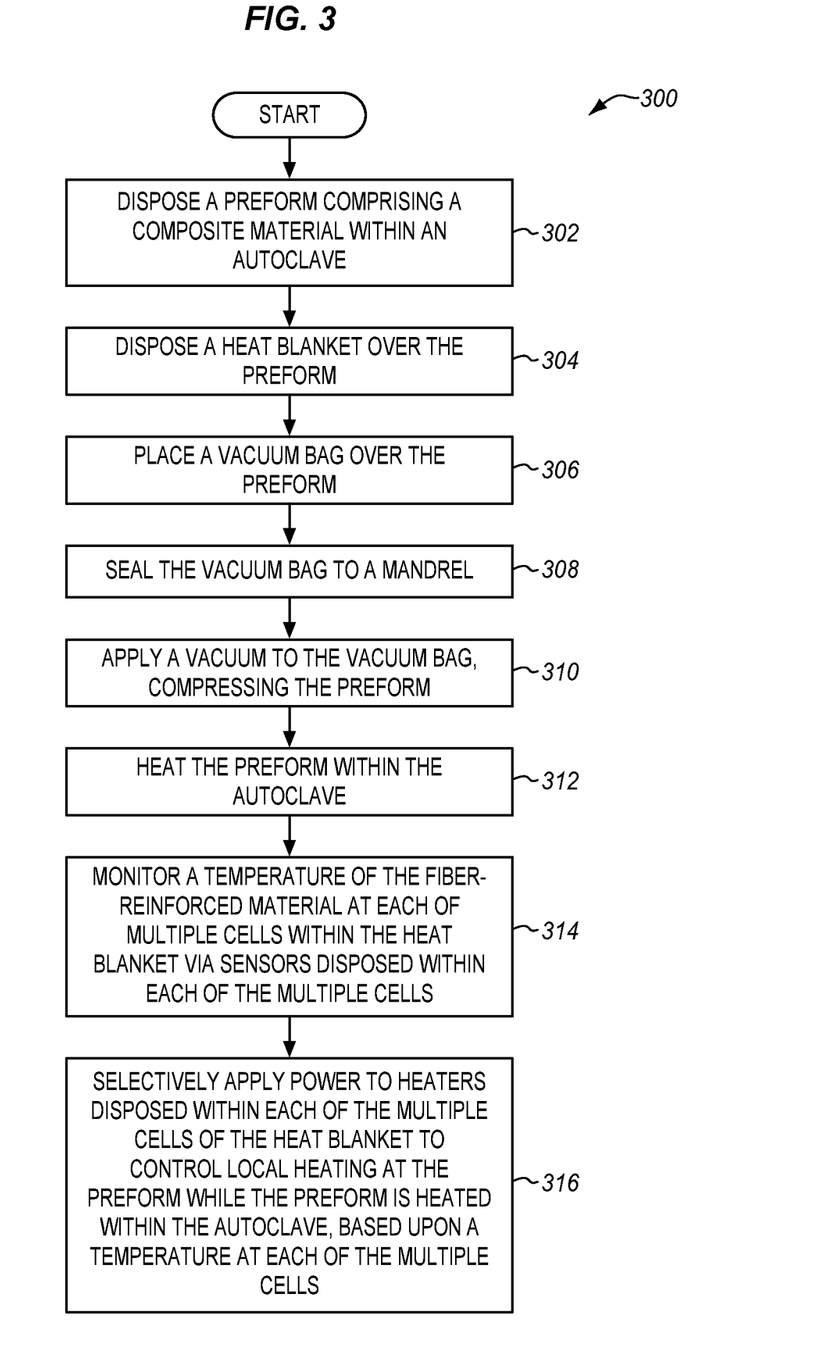
FIG. 3 is a flowchart illustrating a method for fabricating composite parts in an illustrative embodiment.

FIG. 3 is a flowchart illustrating a method 300 for fabricating composite parts in an illustrative embodiment. Assume, for this embodiment, that region 112 comprises a preform awaiting curing into a composite part.

In step 302, the preform, which comprises a composite material (e.g., fiber-reinforced material 114 impregnated with a thermoset resin), is disposed/placed in an autoclave 190.

In step 304, a heat blanket 140 is disposed/placed over the preform. The heat blanket 140 may further be secured around the region 112 or an underlying mandrel 192 via a sealant in order to ensure that the heat blanket 140 does not move relative to the preform during curing. For example, in one embodiment a vacuum bag layup such as that depicted in FIG. 1 is implemented, and the vacuum bag 180 seals the heat blanket 140 in place. A vacuum is applied underneath the vacuum bag 180 to remove gases from the preform in step 306, the vacuum bag is sealed to a mandrel in step 308. In step 310, a vacuum is applied to the vacuum bag, compressing the preform. Specifically, the vacuum applied results in atmospheric pressure outside of the vacuum bag pressing/consolidating the preform during curing.

In step 312, the preform is heated within the autoclave 190. In one embodiment, heating the preform is performed by the controller 160 operating a heating element (e.g., a particularly large or high-intensity resistive heater) of the autoclave. The heating element of the autoclave 190 is distinct from the heating blanket 140, and generates heat which is distributed in a mostly uniform manner throughout the autoclave 190. However, differences in part geometry and/or airflow across the preform result in deltas in part temperature.

In step 314, a temperature of the fiber-reinforced material 114 at each of the cells 150 within the heat blanket 140 is monitored, via sensors 152 distributed across (e.g., disposed within each of) the cells 150. In one embodiment, the controller 160 monitors the temperature of each cell simultaneously (e.g., at a rate of thousands of times per second), and stores this information in memory.

In step 316, the controller 160 selectively applies power to the heaters 154 distributed across (e.g., disposed within each of) the cells 150 of the heat blanket 140, in order to control local heating at the preform while the preform is heated within the autoclave. The amount of power applied is based upon a temperature at each of the cells 150. In one embodiment, the cells 150 increase applied power within a cell if the temperature is below the target, and decrease applied power if the temperature is above the target. In a further embodiment, if one of the cells 150 is increasing in temperature at a lower rate than other cells, the controller 160 applies current (or increases an amount of applied current) to a heater 154 in that cell 150. In one embodiment, selectively applying power is performed by a controller that has been trained via reinforcement learning. In a further embodiment, selectively applying power is performed by comparing measured temperatures to temperature values supplied in a heat map. In this manner, the controller 160 applies heat according to a heat map profile.

Method 300 provides a technical benefit over prior techniques, because it enables autoclave curing processes to be carefully monitored along individual portions of a preform, and also enables localized heating deficiencies (e.g., due to part thickness) to be detected and addressed during the curing process.

Figure 4:
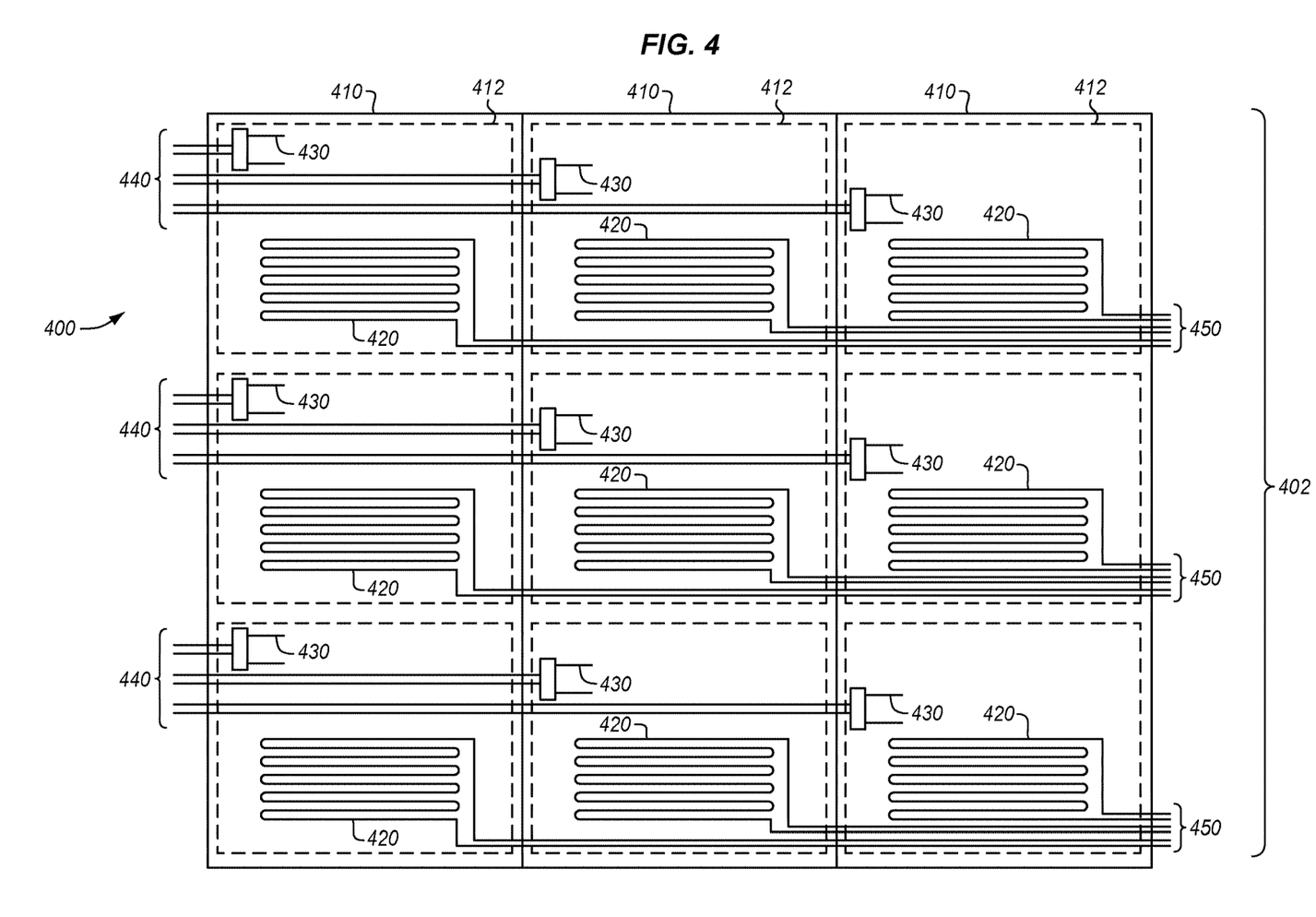
FIG. 4 is a diagram of a heat blanket having a quadrilateral shape comprising multiple cells in an illustrative embodiment.

FIG. 4 is a diagram of a heat blanket 400 having a quadrilateral shape according to a grid 402 that comprises cells 410 in an illustrative embodiment. According to FIG. 4, the cells 410 of the heat blanket 400 define pockets 412 (e.g., voids or spaces), which each are filled with a thermocouple 430 that measures temperature, as well as resistive heaters 420, which generate heat. The amount of heat generated by each of the resistive heaters 420 varies depending on the amount of current applied to the resistive heater. To enable individual control, the resistive heaters 420 include current pathways that proceed out of the cells 410 to locations that are electrically accessible by a controller. The controller adjusts the amount of current applied to each resistive heater 420, based upon a temperature measured by a thermocouple 430 that corresponds therewith. In a further embodiment, resistive heaters 420 are replaced by induction coils that heat carbon fibers within the preform via induction. The thermocouple may be positioned anywhere desired within its cell 410. Electrical connections for the thermocouples 430 are arranged into groups 440 to facilitate the ease with which physical connections are made to the heat blanket, and electrical connections for the resistive heaters 420 is arranged into groups 450 to facilitate the ease with which physical connections are made to the heat blanket.

Figure 5:
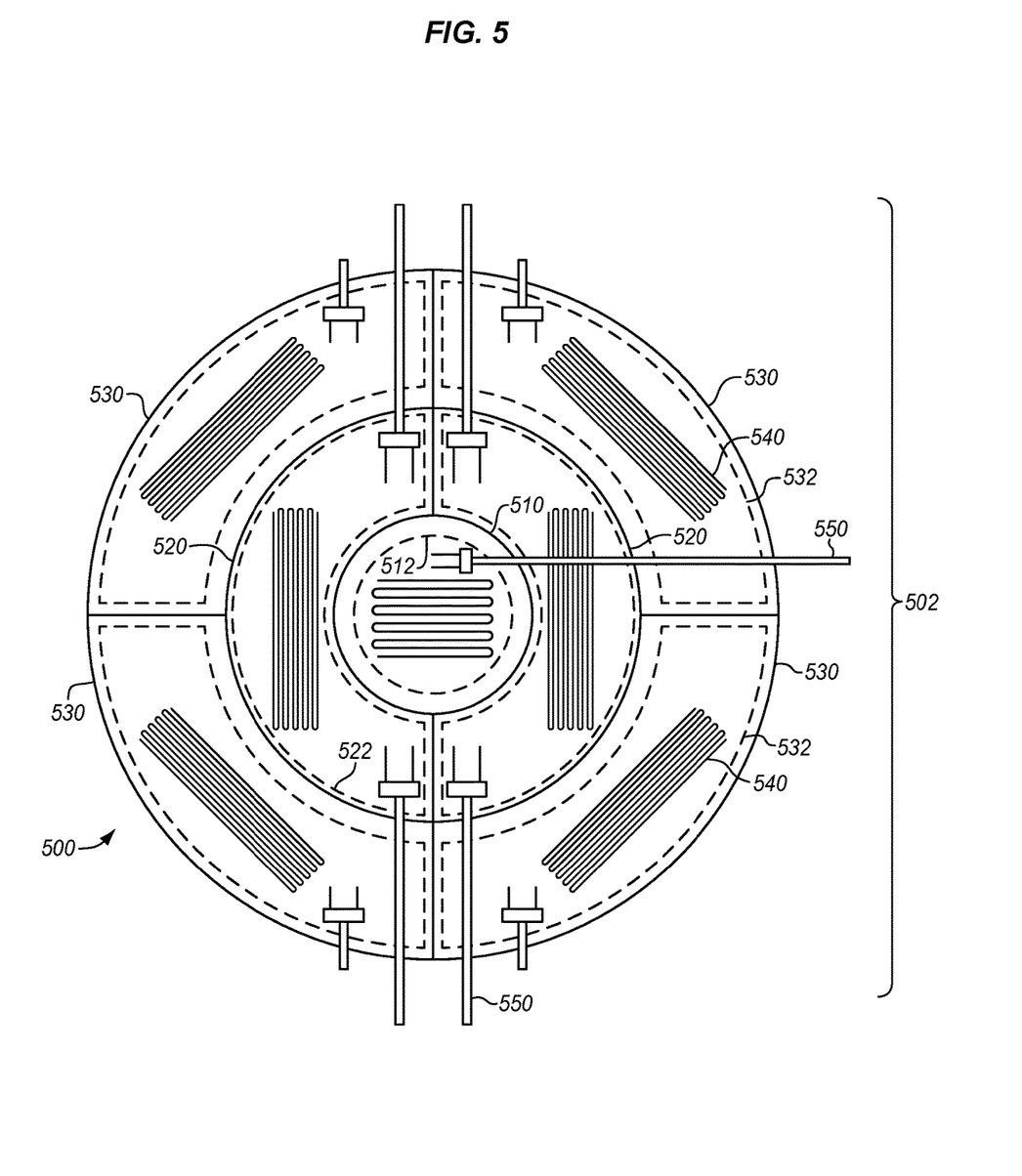
FIG. 5 is a diagram of a circular heat blanket comprising multiple cells in an illustrative embodiment.

FIG. 5 is a diagram of a circular heat blanket 500 comprising multiple cells arranged in a pattern 502 in an illustrative embodiment. The circular heat blanket 500 is arranged into one or more cells 510 within a first ring, cells 520 within a second ring that is concentric with the first ring, and cells 530 that are arranged within a third ring that is concentric with the first ring. Each of cells 510 includes pocket 512, cells 520 include pockets 522, and cells 530 include pockets 532. Each of the cells includes a pocket that holds a sensor 550 and an (independently controllable heater 540. In further embodiments, the heaters are shaped to closely follow the perimeter of their corresponding pockets, and may exhibit an inherent curvature at rest. The number of concentric rings, and the arcuate portion occupied by each cell within a concentric ring, varies depending on the size and type of region undergoing curing. Depending on circumstances and the geometry of the region being repaired, either heat blanket 400 of FIG. 4, or circular heat blanket 500 of FIG. 5 are utilized. Thus, each cell in FIGS. 4-5 works as an independent heat blanket, and the combination of cells forms an overall heat blanket. Cell shapes can be mixed and matched to form any desired shape, and/or may be mixed, sized, and matched to enable more granular control of temperature within specific regions to more closely match a desired heat map.

Figure 6:
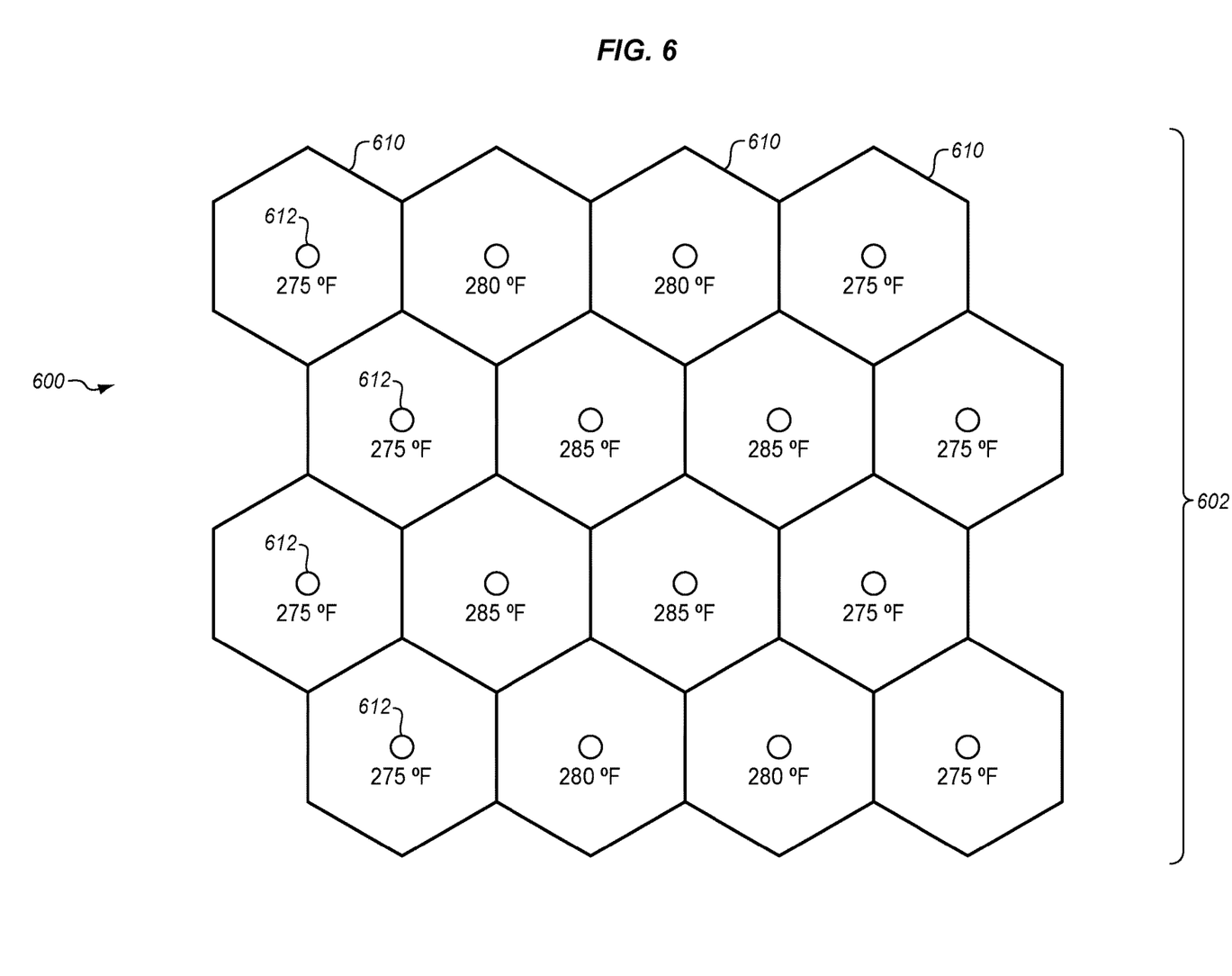
FIG. 6 is a diagram that depicts target temperatures at cells of a heating blanket at a point in time in an illustrative embodiment.

FIG. 6 is a diagram 600 that depicts target temperatures at cells, arranged in a grid 602, of a heating blanket at a point in time in an illustrative embodiment (e.g., as the cells are approaching a curing temperature). As cell sizes decrease as a matter of design choice, temperature variations between neighboring cells also decrease. Thus, smaller cell sizes enable a more granular level of temperature control and more precise matching of a heat map.

As shown in FIG. 6, each cell 610 is assigned a target temperature 612, and the target temperatures 612 are capable of varying between cells 610. This information is stored in a temperature profile in memory, and further may indicate variations in target temperature, or ranges of target temperatures for each cell, that vary over time. For example, during a "ramp up" phase, expected temperatures may increase over time for each cell.

In one embodiment, during operation a controller selects from multiple available temperature profiles. Each temperature profile indicates a target temperature for each of the cells, and the temperature profiles vary depending on the material being cured and/or a geometry of the region being cured.

Figure 7:
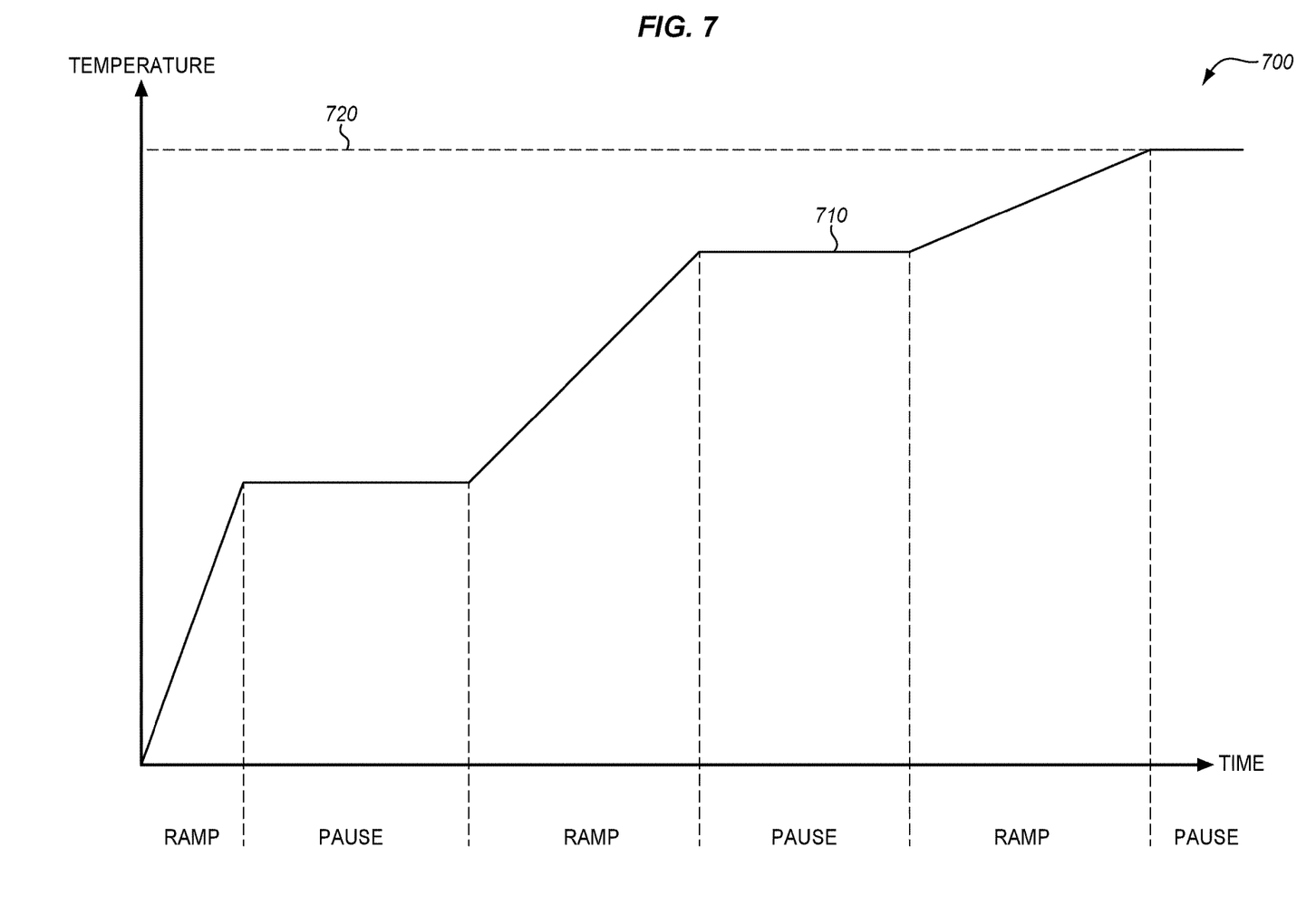
FIG. 7 is a chart illustrating changes to target temperature for a cell over time in an illustrative embodiment.

FIG. 7 is a chart 700 illustrating changes to target temperature for a cell over time in an illustrative embodiment. Specifically, a measured temperature 710 of the cell is expected to ramp in a first phase at a first rate to a first temperature. After a pause during which unexpected delays in heating at this cell or other cells is accounted for, the measured temperature 710 is expected to ramp in a second phase at a second, slower rate until a second temperature is achieved. A similar operation is expected for a third phase of heating, until a curing temperature 720 is achieved. While FIG. 7 depicts changes to target temperature for a single cell over time, a temperature profile may store information dictating changes to target temperature for multiple cells over a period of time. In still further embodiments, the target temperature is defined as a range of temperatures having an upper bound temperature and a lower bound temperature for each of multiple points in time.

In embodiments where a ramp rate is defined for heating, a controller adjusts the amount of power by reducing the amount of power applied to the heater in the cell if the fiber-reinforced material is increasing in temperature faster than the ramp rate, and increasing the amount of power applied to the heater in the cell if the fiber-reinforced material is increasing in temperature faster than the ramp rate.

Information describing preferred temperature-over-time information for a cell, and for multiple other cells, is stored in a temperature profile. The temperature profiles vary in terms or ramp rate and target temperature depending upon operating environment and/or material being cured. In one embodiment, a controller selects from one of temperature profiles, the temperature profiles each indicate a series of target temperatures, times, and ramp rates for heating the fiber-reinforced material, and the selection is based on the type of fiber-reinforced material being heated, a thickness of the composite part at each cell, a number of plies at each cell, a contour of the composite part at each cell, a fiber arrangement of unidirectional tows, fabric, and/or chopped fibers, etc.

Figure 8:
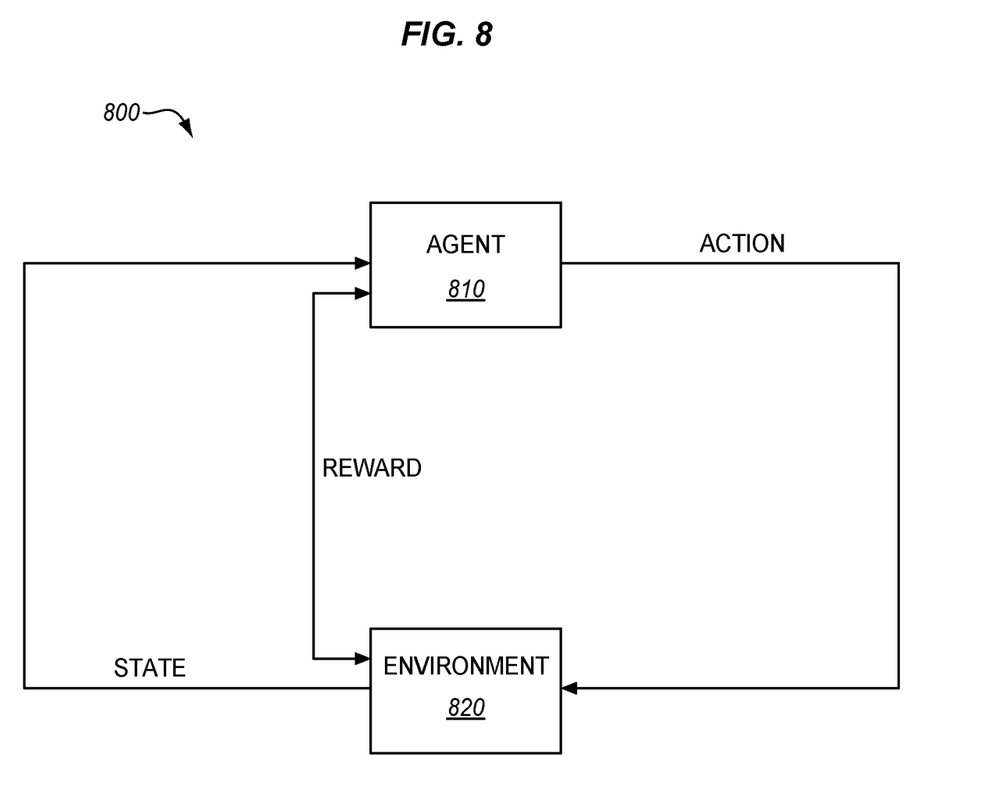
FIG. 8 is a diagram that depicts training of a machine learning model via reinforcement learning in an illustrative embodiment.

FIG. 8 is a diagram 800 that depicts training of a machine learning model via reinforcement learning in an illustrative embodiment. In reinforcement learning, an agent 810 performs random actions within an environment 820, and determines the difference between chains of desirable and undesirable decisions, known as policies. Reinforcement learning provides a score for decisions, based on their resultant outcomes. The scores impact how the agent behaves in future scenarios. Reinforcement learning techniques are also known as "policy iteration" or "value iteration" techniques.

Reinforcement learning techniques cause an agent to build and explore policies. Learned sequences of actions are referred to as policies, and the policies learned by an agent are referred to as a policy network. A policy network therefore stores chains of actions that are performed by an agent and lead to different measurable states. By iteratively performing actions and identifying resulting states, state-action pairs (i.e., actions that lead to desired states) are determined.

In FIG. 8, an agent performs actions by independently adjusting amounts of current applied to heaters in individual cells of a heat blanket. This results in different states in the form of measured temperatures on those cells. By implementing a variety of policies (e.g., in a random fashion) and rewarding the policies that are closer to compliance with desired outcomes (e.g., reaching a curing temperature in a timely manner without substantially exceeding the curing temperature, conformance with a temperature profile), the agent learns to favor these policies.

Stated in other words, the reinforcement learning technique determines each state (e.g., each thermocouple reading) over time, as well as the relation between states to determine whether to change the amount of current to apply to an individual cell. The state for a cell is then monitored, and a nominal temperature for a cure profile (or input temperature) at a specific time is compared to a current state (i.e., temperature reading) of the thermocouple in the cell. The reinforcement learning technique rewards the system when the temperature of the thermocouple is within a cure cycle tolerance of the temperature input.

In these embodiments, the policy network contains state-action (temperature reading and amperage input) pairs that are correlated with material and part geometry. The environment of the system comprises the heat blanket and its components (controller, resistive heater, and a silicone blanket material), and rewards are based upon a difference between a target temperature and the current temperature. Thus, positive rewards are provided when the thermocouple reading is within a tolerance of the target temperature, and the maximum reward is provided for following the cure profile temperature. In this embodiment, value comprises a future reward that an agent receives by taking an action in a particular state. Value may be provided for policies that stay within tolerance, with a greater reward (or negative penalty) being provided for not exceeding an upper tolerance for temperature.

Figure 9:
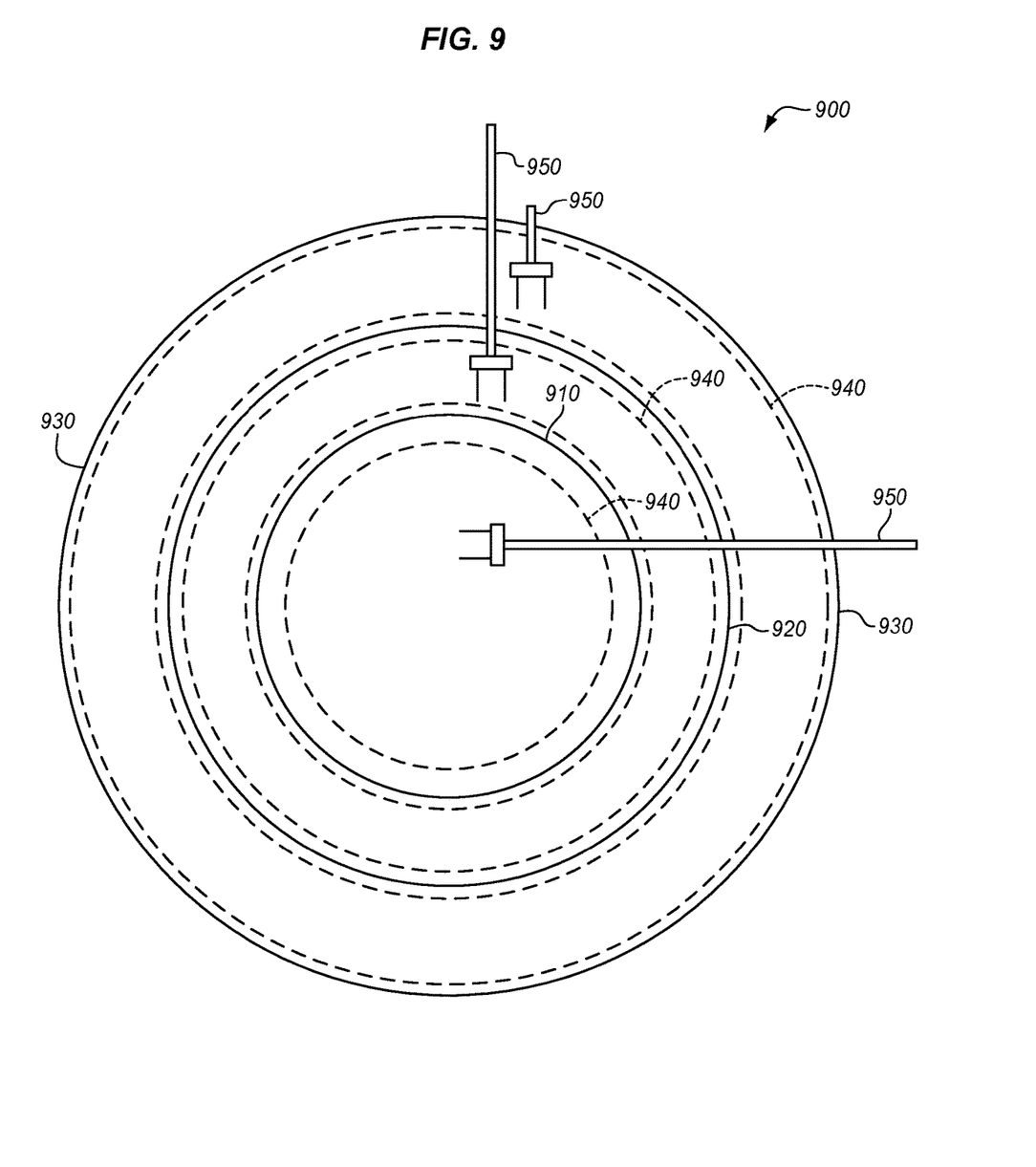
FIG. 9 is a diagram of a circular heat blanket made of concentric rings in an illustrative embodiment.
Figure 10:
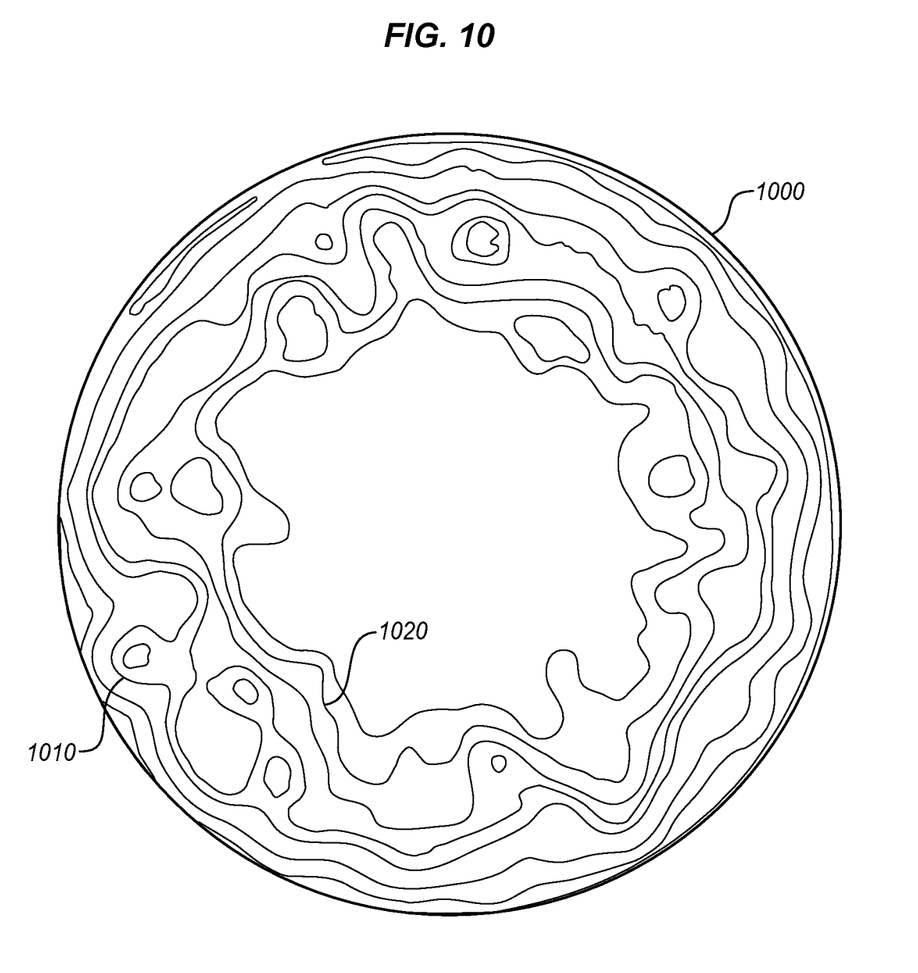
FIG. 10 depicts a heat map for a circular heat blanket in an illustrative embodiment.

FIG. 9 is a diagram of a circular heat blanket made of concentric rings in an illustrative embodiment. In this embodiment, each ring 910, 920, and 930 includes a heating element 940 (e.g., an annular or circular heating element), as well as a thermocouple 950. In further embodiments, FIG. 10 depicts a heat map 1000 for a circular heat blanket in an illustrative embodiment. Heat map 1000 provides highly granular target temperature values that may vary over time. Thus, one portion 1020 of the heat map 1000 may indicate a higher temperature or range of temperatures than another portion 1010 of the heat map 1000. In further embodiments, it may be possible to match rectilinear shapes with circular or elliptical shapes, or other shapes.

EXAMPLES

In the following examples, additional processes, systems, and methods are described in the context of a curing system for a composite part.

Figure 11:
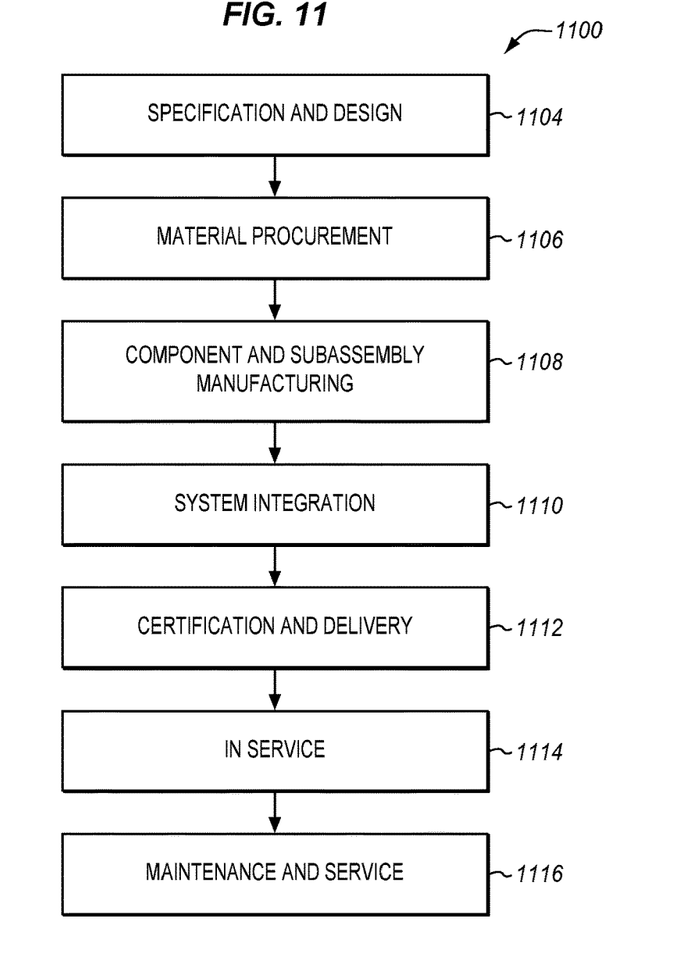
FIG. 11 is a flow diagram of aircraft production and service methodology in an illustrative embodiment.
Figure 12:
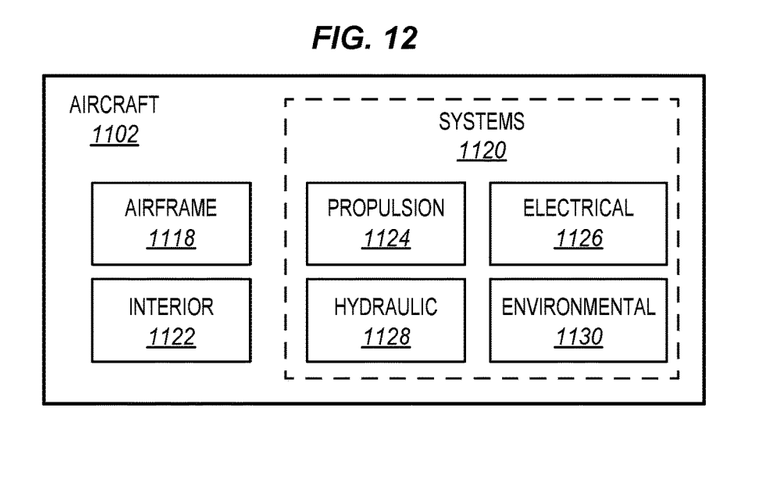
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic 1128, and/or environmental system 1130.

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to manufacture new parts, as well as in maintenance and service 1116 to repair existing parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for curing a composite part, the method comprising, the steps of:
    applying a heat blanket to a composite material;
    selecting one from multiple temperature profiles that each indicate a series of target temperatures, times, and ramp rates for heating the composite material, wherein the selecting is based on a type of fiber-reinforced material being heated;
    applying, with a controller, power to heaters distributed across multiple cells of a heat blanket to heat the composite material at the heat blanket in accordance with the profile;
    monitoring, with the controller, a temperature of the composite material at each of the multiple cells; and
    individually adjusting, with the controller, an amount of power applied to heaters, for each of the multiple cells, in response to the monitored temperature and a target temperature, wherein target temperatures change over time for the multiple cells, such that for the multiple cells the target temperatures comprise a first phase of increasing temperature at a first rate, and a second phase of increasing temperature at a second rate that is slower than the first rate.

2. The method of claim 1 wherein:
    the target temperature is a range of temperatures that includes a curing temperature of a thermoset resin.

3. The method of claim 1 wherein the step of:
    adjusting the amount of power comprises selectively adjusting between decreasing power applied to a heater in the cell in response to determining that a cell temperature is higher than the target temperature, and increasing power applied to the heater in the cell in response to determining that the cell temperature is lower than the target temperature.

4. The method of claim 3 further comprising:
    selecting a temperature profile indicating a target temperature for each of the multiple cells, wherein target temperatures vary between cells.

5. The method of claim 1 wherein:
    the target temperatures further comprise a third phase of increasing temperature at a third rate that is slower than the second rate.

6. The method of claim 1 wherein:
    the selecting of the temperature profile is also based on a thickness of the composite part at each cell.

7. The method of claim 1 wherein:
    adjusting the amount of power comprises adjusting the amount of power selectively between:
        reducing the amount of power applied to a heater in the cell if the fiber-reinforced material is increasing in temperature faster than the ramp rate; and
        increasing the amount of power applied to the heater in the cell if the fiber-reinforced material is increasing in temperature faster than the ramp rate.

8. The method of claim 1 further comprising:
    performing reinforcement learning to train how power is adjusted, wherein during the reinforcement learning an agent performs actions by independently adjusting amounts of current applied to heaters in individual cells of the heat blanket.

9. The method of claim 1 wherein:
    monitoring and adjusting power for each of the multiple cells is performed simultaneously in real-time.

10. The method of claim 1 wherein:
    the monitoring is performed via thermocouples distributed across the multiple cells.

11. A non-transitory computer readable medium embodying programmed instructions which, when executed by a processor, are operable for performing a method for curing a composite part, the method comprising:
    applying a heat blanket to a composite material;
    selecting one from multiple temperature profiles that each indicate a series of target temperatures, times, and ramp rates for heating the composite material, wherein the selecting is based on a type of fiber-reinforced material being heated;
    applying, with a controller, power to heaters distributed across multiple cells of a heat blanket to heat a composite material at the heat blanket in accordance with the profile;
    monitoring, with the controller, a temperature of the composite material at each of the multiple cells; and
    individually adjusting, with the controller, an amount of power applied to heaters, for each of the multiple cells, in response to the monitored temperature and a target temperature, wherein target temperatures change over time for the multiple cells, such that for the multiple cells the target temperatures comprise a first phase of increasing temperature at a first rate, and a second phase of increasing temperature at a second rate that is slower than the first rate.

12. The medium of claim 11 wherein:
    the target temperature is a range that includes a curing temperature of a thermoset resin.

13. The medium of claim 11 wherein:
    adjusting the amount of power comprises selectively adjusting between decreasing power applied to a heater in the cell in response to determining that a cell temperature is higher than the target temperature, and increasing power applied to the heater in the cell in response to determining that the cell temperature is lower than the target temperature.

14. The medium of claim 13 wherein the method further comprises:
    selecting a temperature profile indicating a target temperature for each of the multiple cells, wherein target temperatures vary between cells.

15. The medium of claim 11 wherein:
    the target temperatures further comprise a third phase of increasing temperature at a third rate that is slower than the second rate.

16. The medium of claim 11 wherein:
the selecting of the temperature profile is also based on a thickness of the composite part at each cell.

17. The medium of claim 11 wherein:
adjusting the amount of power comprises:
reducing the amount of power applied to a heater in the cell if the fiber-reinforced material is increasing in temperature faster than the ramp rate; and
increasing the amount of power applied to the heater in the cell if the fiber-reinforced material is increasing in temperature faster than the ramp rate.

18. The medium of claim 11 wherein the method further comprises:
performing reinforcement learning to train how power is adjusted, wherein during the reinforcement learning an agent performs actions by independently adjusting amounts of current applied to heaters in individual cells of the heat blanket.

19. The medium of claim 11 wherein:
monitoring and adjusting power for each of the multiple cells is performed simultaneously and in real-time.

20. The medium of claim 11 wherein:
the monitoring is performed via thermocouples distributed across the multiple cells.

21. A method for fabricating a composite part, the method comprising: disposing a preform comprising a fiber-reinforced material impregnated with a thermoset resin onto a mandrel;
applying a heat blanket over the preform;
heating the preform in accordance with a profile selected from multiple temperature profiles that each indicate a series of target temperatures, times, and ramp rates for heating fiber-reinforced material, wherein the selection is based on a type of the fiber-reinforced material being heated;
monitoring a temperature of the fiber-reinforced material at each of multiple cells within the heat blanket; and
selectively applying power to heaters distributed across the multiple cells of the heat blanket to control local heating at the preform while the preform is heated, based upon a temperature at each of the multiple cells, wherein power is applied based on target temperatures that change over time for the multiple cells, such that for the multiple cells the target temperatures comprise a first phase of increasing temperature at a first rate, and a second phase of increasing temperature at a second rate that is slower than the first rate.

22. The method of claim 21 wherein:
selectively applying power is performed by a controller that has been trained via reinforcement learning.

23. The method of claim 21 wherein:
monitoring a temperature of the fiber-reinforced material at each of multiple cells within the heat blanket is performed via thermocouples distributed across the multiple cells.

24. The method of claim 21 wherein:
the target temperatures are a range of temperatures that includes a curing temperature of a thermoset resin.

25. The method of claim 21 wherein the step of:
selectively applying power comprises selectively adjusting between decreasing power applied to a heater in a cell in response to determining that a cell temperature is higher than the target temperatures, and increasing power applied to the heater in the cell in response to determining that the cell temperature is lower than the target temperatures.

26. The method of claim 25 further comprising:
selecting a temperature profile indicating a target temperature for each of the multiple cells, wherein target temperatures vary between cells.

27. The method of claim 21 wherein:
the target temperatures further comprise a third phase of increasing temperature at a third rate that is slower than the second rate.

28. The method of claim 26 wherein:
the selecting of the temperature profile is also based on a thickness of the composite part at each cell.

29. The method of claim 21 wherein:
monitoring and selectively applying power for each of the multiple cells is performed simultaneously in real-time.

* * * * *